United States Patent Office 3,454,869
Patented July 8, 1969

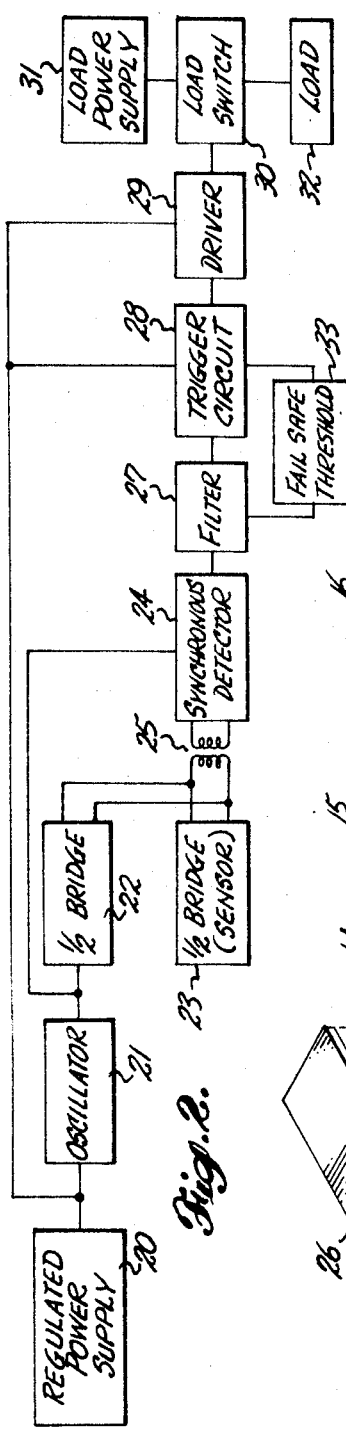
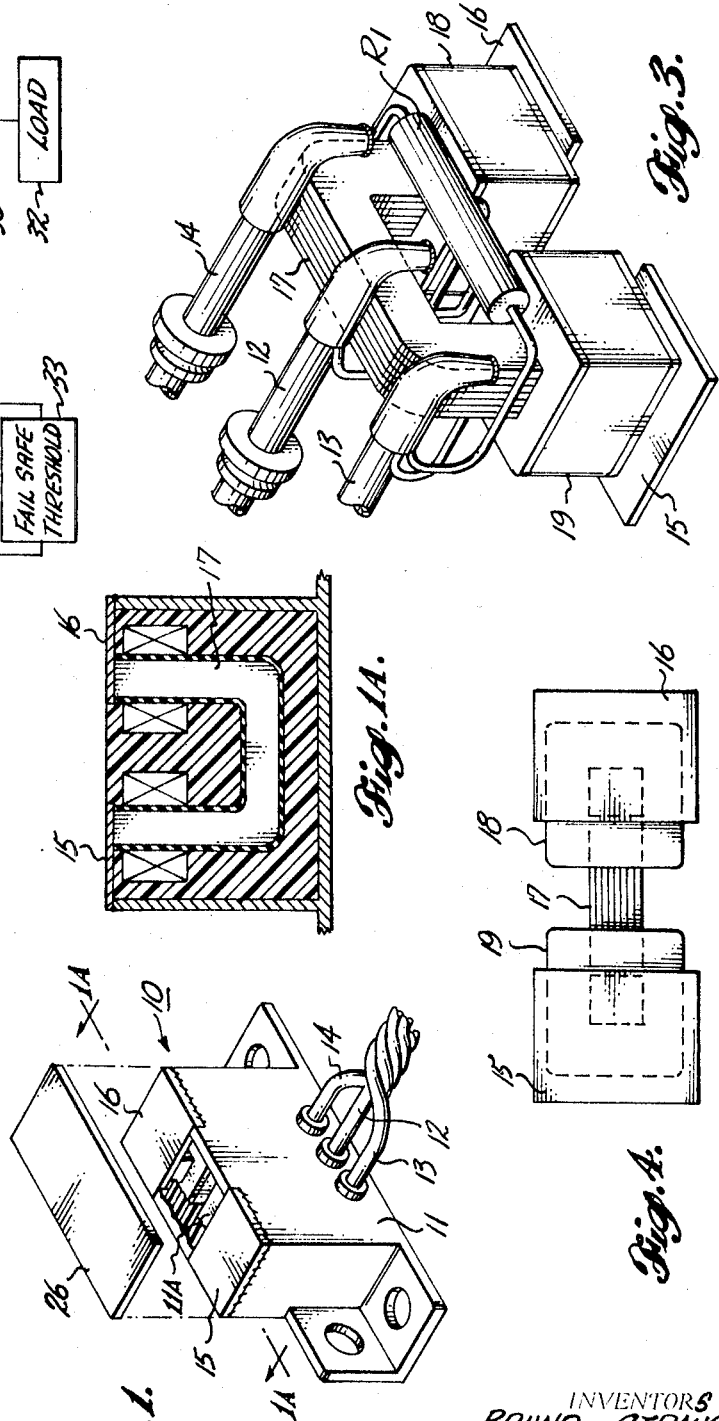

3,454,869
PROXIMITY SENSING SYSTEM
Bruno Strauss, Seattle, and Robert B. Banks, Bellevue, Wash., assignors to Electro Development Corporation, Seattle, Wash., a corporation of Washington
Filed Dec. 23, 1966, Ser. No. 604,284
Int. Cl. G01r 17/10
U.S. Cl. 323—75
16 Claims

ABSTRACT OF THE DISCLOSURE

A variable reactance sensing system utilizing a laminated core preferably of U configuration with one or preferably more drive windings positioned about the core. A pair of field diffusing plates are welded to the ends of the core by means of a novel method of fabrication with the plates forming part of the protective housing for the core and coils. Undesirable coupling between the leg ends is avoided and sensitivity to the position of a ferromagnetic target is increased. The sensing unit forms part of a balanced bridge with the resistive leg of the balanced bridge including a resistor maintained physically adjacent to the inductor and hence subjected to the same thermal environment to thereby accommodate extraneous thermally induced signals. Mechanical details of the housing for the sensing unit as well as electric circuit diagrams are described.

---

The present invention relates to proximity switches and more particularly to a proximity switch operating on the basis of a variable reactance pickup or sensing unit which can be positioned remote from the necessary electronic switching circuitry which controls the application of power to a given load. In the art of switching electric current to a load there are many situations which require the positioning of a sensing unit or switch assembly in environmental conditions which render the life of the switch or sensing assembly short and also which render system operation uncertain. One example of the need for electric switch assemblies which must operate under adverse conditions is in the field of aircraft. On an airplane numerous switch assemblies are subjected to extreme heat and extreme cold, high vibration and shock, as well as to chemicals, corrosive fluids, and adverse weather conditions such as snow, sleet and rain. Conventional mechanical switches simply will not stand up under the extremes encountered by an aircraft and yet in many applications on the aircraft it is essential to have a current control and switching assembly which will provide assured operation in response to a control function. Proximity switches of the type provided by the present invention are well protected against the adverse conditions mentioned above and overcome many of the problems heretofore encountered in the art.

It is thus an object of the present invention to provide a system having a high degree of sensitivity to a proper target, a high degree of insensitivity to improper targets, and which operates over extremely large temperature ranges with small inaccuracy. It is another object to provide a system which exploits not only reluctance variation but also coupling variation to achieve even greater sensitivity. Another object of the present invention is to provide an improved proximity sensing unit in combination with an improved current switching circuit with the system having a hysteresis characteristic such that "snap action" is achieved in response to a target being moved closer to or farther away from the sensing unit.

Another object is to provide an improved variable reactance proximity sensing system which responds to target movement into the proximity of the sensor at relatively large distances from the sensor. Another object of the present invention is to provide an improved proximity sensing system having the ability to operate under adverse environmental conditions as well as under electrical conditions such as in the presence of extraneous electromagnetic fields. An additional object of the invention is to provide a variable reactance proximity sensing system for operating a current switch wherein the sensing portion of the system can be coupled with the current switching portion of the system by relatively long electrical leads with the leads being adjacent to other current conductors carrying alternating current and yet wherein the system is highly nonresponsive to the extraneous fields and signals induced in the leads by virtue of their proximity to the other current conductors.

The above and additional objects and advantages of the invention are achieved through the use of a system wherein a sensor is so constructed as to be able to survive in an extreme, uncontrollable environment with the sensor being coupled to an electronics package which is not stressed either electrically or environmentally. The system includes an oscillator coupled with a Maxwell bridge and with a synchronous detector which is responsive to changes in the inductive leg of the bridge. The inductive leg of the bridge as well as one of the resistive legs can be physically remote from the other two legs of the bridge and the synchronous detector. The oscillator is operated at a frequency such that harmonics of the power supply currents in the environment wherein the proximity system is utilized do not affect the output signals from the synchronous detector. A Schmitt trigger circuit coupled with the synchronous detector serves to control a current switching network in a manner such that current is either applied to a load or discontinued in accordance with the position of a target member maintained in the general vicinity of the sensing unit and moved toward or away from the effective field established by the inductors in the sensing unit.

The synchronous detector by being coupled with the oscillator which drives the Maxwell bridge in effect operates as an on-off switch and serves to couple output signals from the bridge network to the Schmitt trigger circuit. A capacitor coupled across the synchronous detector serves to average out extraneous signals which might be induced at a frequency different from the frequency of the signals applied to the detector by the oscillator. A transformer output circuit for the bridge adds to the rejection of common mode error signals. The system includes failsafe circuitry which prevents undesired changes in the current control section should the sensing leads be shorted or opened.

In the art of constructing proximity sensing systems it has been found that air gaps in the magnetic circuit cause degradation of system sensitivity and accuracy requiring relatively small distances between sensor and target device to obtain reliable switching. Since it is desirable to operate a proximity sensor at relatively large "gap" distances, with relatively small differential distances between "ON" and "OFF" states, it is important to maximize "sensitivity," defining that term as the rate of change of reactance (or inductance) at a given "gap" distance. The present invention accomplishes this in the following ways. Magnetically permeable stainless steel plates are welded to the ends of a U-shaped laminated core assembly to enhance the system sensitivity by minimizing air gap between core and pole pieces by providing, by use of pole pieces, a large effective area of flux emission. Therefore a large effective area subtends the target area. This reduces the reluctance of the magnetic path and enhances system operation. It also provides an outer surface which is substantially impervious to environmental conditions. Since the stainless steel plates are welded to the ends of the core legs, a continuous core assembly is provided having the advantages of a laminated core structure for magnetic characteristics and yet having the advantages of stainless steel for environmental advantages. The remainder of the housing can be made of material such as non-magnetic stainless steel with the pole piece end plates being welded thereto to act as part of the housing. A suitable potting compound is disposed about the components within the housing to further protect the same. The effects of an air gap in such a system are avoided, with undesirable coupling between the ends of the legs being substantially reduced. In one preferred embodiment first and second coils are disposed on the core legs in a manner such that system sensitivity is enhanced due to change in coupling between the coils as well as to changes in reluctance as the target member is moved toward and away from the sensor.

The above as well as additional advantages and objects of the invention will be more clearly understood from the following description when read with reference to the accompanying drawings.

FIGURE 1 is a perspective view of a preferred embodiment of the invention illustrating an assembled sensing unit with a part of the top center section broken away to show how the internal parts appear, and FIGURE 1A is a section along 1A—1A.

FIGURE 2 is a block diagram of the arrangement of electrical components of one preferred embodiment of the invention.

FIGURE 3 is a perspective view of the interior of the assembly of FIGURE 1 showing the core and pole face structure together with the coils and resistor in the half of the bridge circuit of FIGURE 2 included within the sensor with the parts being shown in their inverted positions with respect to FIGURE 1 to more clearly illustrate the arrangement of parts.

FIGURE 4 is a top view of the laminated core and stainless steel pole face assembly.

Figure 5:
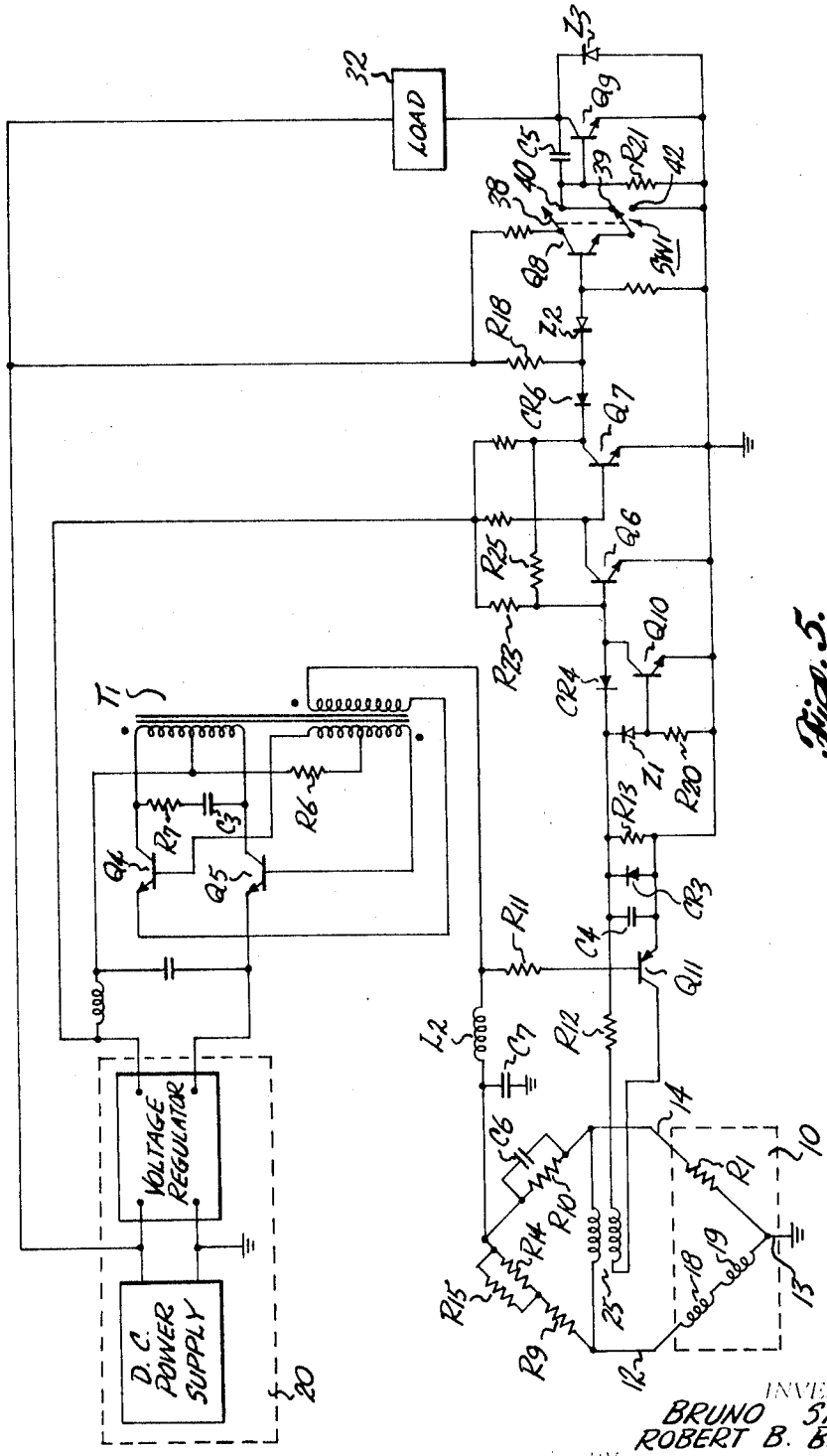
FIGURE 5 is a schematic circuit diagram corresponding in general to the system shown in the block diagram of FIGURE 2.

The proximity sensing system includes a sensing unit or "sensor" as well as a current control section or switch which is controlled by the sensor. In FIGURE 1 the sensor 10 will be seen to include a stainless steel casing 11 having three electrical leads 12, 13 and 14 passing through sealed joints in one side of the unit. In the illustration of FIGURE 1 the top surface of the sensor 10 includes pole pieces 15 and 16 which are made of magnetic stainless steel shown as being seam welded to the housing or case 11. As seen most clearly in FIGURES 3 and 4, the pole piece 15 and 16 are welded to the ends of the two legs of a U shaped laminated core 17. Distributed coils 18 and 19 are respectively disposed about legs 17A and 17B of the laminated core 17 for reasons discussed hereinafter. After the internal components have been properly arranged within the housing 11 with the pole faces 15 and 16 welded to the casing 11 the assembly is preferably potted with a suitable compound to protect the components. While various compounds could be used, Emmerson-Cummings STy-Cast 2762 epoxy has been found satisfactory. A portion 11A of the case may be potting compound with said portion 11A and the pole faces 15 and 16 defining a plane surface. The portion 11A of the case could also be made of nonmagnetic stainless steel or titanium welded to the plates 15 and 16 and to the other part of the housing.

The coils 18 and 19 disposed about the laminated core form part of a Maxwell bridge with the arrangement being such that one half of the bridge is contained within the housing 11 while the ther half of the bridge is maintained adjacent to the electronic control section of the proximity switch system. In the block diagram of FIGURE 2 the system is shown as including a regulated power supply 20 coupled with an oscillator 21 which in turn serves to energize a bridge circuit of the Maxwell type shown as including the half bridge sections 22 and 23. The oscillator 21 also serves to operate a synchronous detector 24 which is coupled with the portion of the bridge circuit contained within the housing 11 by means of the signal transformer 25. The arrangement is such that changes in bridge balance caused by the relative positioning of a ferromagnetic target member 26 (FIGURE 1) with respect to the pole faces 15 and 16 causes output signals from the detector 24 to be applied via filter 27 to the trigger circuit 28 which in turn controls a transistor driver circuit 29. A load switch 30 connected between the load power supply 31 and any electrical load 32 is thus controlled in accordance with the condition of the bridge circuit which is in turn controlled by the position of the target member 26. To avoid undesired switching of load current a fail-safe threshold circuit 33 is connected in a feedback arrangement between the trigger circuit 28 and the detector 24 (and described in detail hereinafter).

The system is designed to effectively measure or respond to a change in the sensor inductance as determined by the separation between the sensor and the positionable target 26. In addition, and as described in greater detail hereinafter, the system is so designed that a change in coupling between coils 18 and 19 occurs as the target member 26 is moved. As the target distance to the sensor is decreased, the inductance is increased due to decreased relutance and coupling between coils 18 and 19 increases to further increase inductance until bridge balance is sufficiently disturbed to cause the load switch 30 to change its state of conduction. The specific system shown in FIGURE 2 and in greater detail in FIGURE 5 utilizes a Maxwell bridge driven by a square wave oscillator with a synchronous detector serving to rectify the bridge output and apply the resulting signal to the level detector or trigger circuit 28. In the circuit shown in FIGURE 5 the oscillator 21 includes the transistors Q4, Q5, T1, R6, R7, and C3. The oscillator operates essentially as a square wave generator with the frequency being determined by the saturation characteristics of transformer T1 and the regulated voltage supply 20. R6 is the starting resistor and R7 together with C3 suppresses collector spike voltages on the alternately saturated transistors Q4 and Q5. Output signals from the oscillator are passed through the RFI filter of L2 and C7 which operates to remove high frequency components of the square wave. The filtered signals are then applied to the Maxwell bridge with one half of the bridge consisting of R9, R14 and R15 as the resistive leg and C6, R10 making up the reactive leg. R14 and R15 in parallel permit calibration of the circuit for actuation at a fixed gap. The resistor R9 is a temperature coefficient resistor used to compensate for variations in the capacitor C6.

The sensor includes the other half of the Maxwell bridge and is physically remote from the top half of the bridge shown in FIGURE 5. The inductors 18 and 19 will be seen to be connected in series circuit relation as one leg of the second half of the bridge. A temperature coefficient resistor R1 completes the bridge circuit and is physically located adjacent to the coils within the sensor unit as seen in FIGURE 3. It will be seen that three wires 12, 13 and 14 extend from the sensor to the upper half of the bridge circuit. The wire 13 is the common return wire and is provided for circuit grounding at points physically remote from the location of the sensing unit. This three wire system in the Maxwell bridge allows the temperature compensating element in the sensor to be a wire wound resistor with a predetermined temperature coefficient. The resistance of resistor R1 as well as the temperature coefficient thereof are selected to compensate for the temperature caused variations of both the resistance and the inductance of the components of the sensor coils. For this reason as well as for fail-safe advantages described hereinafter, the bridge is never perfectly balanced and hence the signal output transformer 25 continually provides output signals which vary in magnitude in accordance with the relative positioning of the target 26. The physical and electrical arrangement of the parts in the sensor with relation to the other circuitry provides the important advantage of accurate system operation over a wide temperature range without the necessity of a temperature compensating reactance within the sensor.

The bridge output signals from the secondary winding of transformer 25 are applied to the transistor Q11 which is coupled by base resistor R11 to the oscillator 21 in a manner such that the transistor Q11 operates as a synchronous detector. The use of the transformer 25 as the output circuit for the bridge provides substantial rejection capability for common mode voltages which might be present on the sensor leads. The synchronous detector in turn rejects any differential pickup that might be passed by the transformer 25. The capacitor C4 and resistor R12 serve to filter the chopped signal with capacitor C4 serving to average out any signals which are not in synchronization with the switching of transistor Q11 by the oscillator. Diode CR3 connected in parallel with the capacitor C4 clamps the output voltage and thus prevents any reverse charging of capacitor C4 in the event of an open sensor wire. The resistor R13 is the load resistor for the output signals to the trigger circuitry and serves to prevent turn-on transients.

A level detector in the form of a Schmitt trigger circuit is provided by the transistors Q6 and Q7, which can also be considered as a positive feedback amplifier with resistor R25 providing feedback and hysteresis. Diode CR4 connected between the base of transistor Q6 and the load resistor R13 across which output signals from the balanced bridge are applied forms part of the positive feedback amplifier. Resistor R23 connected between the base of transistor Q6 and the power supply provides drive current to hold the switch in an actuated state. This current is shunted to ground by the signal voltage through CR4 when the signal is less than a predetermined threshold voltage. Diode CR4 also temperature compensates the base-emitter voltage at Q6, thus maintaining a constant threshold requirement. Diode CR6, resistor R18, and the Zener diode Z2 form a gate to insure a level change at the collector of transistor Q7 establishing sufficient feedback voltage for positive two state switching.

The operation of the level detector is equivalent to the snap action of a mechanical switch with the gating voltage being applied to drive transistor Q8. Transistor Q8 can be connected in either common collector or common emitter configuration to change the current control mode from normally open to normally closed. For this purpose the circuit diagram of FIGURE 5 is shown as including a switch SW1 having wipers 38 and 39 interconnected for simultaneous movement and respectively engageable with the contact 40 and with contacts 41 or 42. The contact 40 will be seen to be connected to the base of the load current switch Q9 connected in series circuit with the load 32 and protected by Zener diode Z3 against large voltage transients when breaking an inductive load. Resistor R21 holds the output switch off when base drive is not present. Capacitor C5 slows the switching time of the load switch to prevent radio frequency interference noise on switch opening or closing. With the switch SW1 in the position indicated in FIGURE 5 the transistor Q9 is normally nonconducting when the target 26 is at its maximum distance from the sensing unit and is rendered conductive when the target is moved into the proximity of the pole faces.

The sensor is designed to operate in positions remote from the electronic package and thus the possibility of broken or shorted sensor wires exists. The system is designed to provide for fail-safe operation by deactuating the load should this occur. A broken inductor sensor lead 12 or a shorted-to-ground reference leg lead 14 results in a hard actuated signal at capacitor C4. This signal exceeds the threshold of the Zener diode Z1 plus the base-emitter drop of Q10. When the Zener diode Z1 breaks down transistor Q10 is rendered conductive and serves to shunt the drive current at the base of transistor Q6 to ground. With transistor Q6 held against conduction by the conduction of transistor Q10 it will be seen that transistor Q7 is maintained conductive and hence transistor Q8 is held against conduction. Thus with the switch SW1 in the position indicated the main current control transistor Q9 will be held against conduction and fail-safe operation is assured. This will be more clearly seen if one considers that a failure in the sensor wiring results in one of three detector output signals. A large negative output signal equivalent to a "deactuated" signal is provided if the sensor lead 14 is open or if the sensor lead 12 is shorted to the lead 13 or ground. A second output which can occur is a zero output from the transformer 25 which could be caused by an open lead 13 or shorting of the sensor lead 12 to the sensor lead 14. Should this occur the detector load resistor R13 shunts current from R23 to ground causing transistor Q6 to become nonconductive and in turn causing transistor Q9 to become nonconductive. The third signal which can occur is a large positive output signal exceeding the maximum attainable output signal from a normal bridge condition. This positive signal would exceed the Zener voltage of diode Z1 causing the previously described circuit operation. Such a large positive output signal from the sensor could be caused by the lead 12 being open or the lead 14 being shorted to lead 13 or ground. Thus it will be seen that true fail-safe operation is achieved since any combination of open or short conditions on the sensor leads will be a redundant case of the described operations and will cause a deactuated switch output. It it obvious that if the switch SW1 is moved to its alternative position that the described fail-safe operations will result in transistor Q9 being rendered conductive in each case.

Turning now to the mechanical features of the sensor it will be been in FIGURES 3 and 3A that the stainless steel pole pieces 15 and 16 are welded to the ends of the laminated core 17 so that a continuous magnetic path is provided between the core 17 and the pole faces. While other magnetic materials might be used for the pole faces the environment resistance of the stainless steel plates 15 and 16 provides obvious advantages when one considers that excellent magnetic field characteristics as well as excellent mechanical ruggedness and corrosion resistance are obtained. It will be seen that the pole pieces 15 and 16 are welded to the ends of the core 17 in a manner such that the effective areas of the ends of the core are increased so that the resulting field subtends the maximum target area with the separation between the pieces 15 and 16 also being maximized in order to reduce undesired coupling between the legs of the core. The coils 18 and 19 are distributed about the core in a manner such that when the two coils are in the "uncoupled" state they have an inductance of (1) $$L \approx k_1 2 \times N^2 = k_1 2 N^2$$

In the "coupled" state (i.e. with the target positioned relatively close to the pole faces such that the reluctance is relatively low) the inductance is (2) $$L \approx k_2 (2N)^2 = k_2 4N^2$$

From the equations it will be seen that the inductance (or reactance) changes in a twofold advantageous manner due to a change in reluctance and to a change in coupling between the coils.

The use of a U shaped core provides the advantage of maximum separation of the poles and in addition the use of high permeability laminated core material and pole pieces welded thereto gives an optimum size-distance relationship for the sensor. However, it is found that when a laminated core is subjected to the forces which result from expansion and contraction of the potting compound the electrical characteristics of the system are degraded. We have discovered that if the core is first coated with a resilient protective material of an elastic nature prior to the application of the epoxy potting compound changes in inductance due to thermally induced stress are avoided and yet the advantages of ruggedness due to complete encapsulation are realized. Thus as seen in FIGURE 1A the core 17 is preferably coated with a resilient elastic material such as the readily available room temperature vulcanizing material known in the art as RTV-11 and indicated in FIGURE 1A as the coating 45. The interior of the casing 11 is then filled completely with a suitable protective material such as the epoxy compound sold under the name Sty-Cast 2762 by Emmerson-Cummings Company. This material is found to have a coefficient of expansion similar to that of stainless steel or other metals which might be used for the housing.

As previously mentioned, the plates 15 and 16 are advantageously welded to the ends of the core legs. In accordance with one method of fabricatiton each plate is held under pressure against the end of a leg. Appropriate electrodes are then respectively engaged with the plate and with the associated leg of the core. The electrode connection to the core is preferably made across the edges of the laminations so that current is carried by each lamination and thus a strong weld obtained.

There has been disclosed an improved proximity sensing system which includes not only an improved electrical system making use of a novel balanced bridge-current switching system but also which achieves mechanical advantages of ruggedness and nonsensitivity to environmental conditions heretofore not achieved in the art. Through the use of pole pieces welded to a core assembly a continuous magnetic path is provided with the pole pieces serving as part of the casing or housing for the sensor assembly. It has been found that by following the teachings of the present invention long unshielded wire runs in the presence of extraneous fields such as encountered in an aircraft can be utilized between the sensor and the current control section. In addition to being extremely rugged from the mechanical standpoint it is found that the sensor can be subjected to extreme thermal conditions with temperature variations of several hundred degrees F. having no adverse effect on system operation. One such unit operated in a satisfactory manner over a temperature range of −100 to +400° F. In many applications the physical size of the sensing unit can be of importance. The teachings of the present invention make possible a compact unit which permits target movement at a relatively large distance from the sensor for causing current switching and thus the tolerances on the mechanical mechanism for moving the target can be low. In the above-mentioned unit the entire assembly was packaged within a housing of approximately 1.2 by 0.5 by 0.9 inch.

While the invention has been disclosed by reference to presently preferred embodiments thereof it is to be understood that those changes and modifications which become obvious to a person skilled in the art as a result of the teachings hereof will be encompassed by the following claims.

What is claimed is:

1. A proximity sensing system comprising in combination: variable reactance magnetic circuit means including a high permeability core; excitation coil means disposed about said core; bridge circuit means including said coil means and including an impedance element; bridge excitation and detector means coupled with said coil means and said impedance element; high permeability plate means secured to an end of said core to define the sensing area for the system; and housing means including said plate means disposed about and completely encompassing said coil means and said core, whereby said plate means forms part of the magnetic circuit and is also part of the housing.

2. A system as defined in claim 1 wherein said impedance element is inside said housing means.

3. A system as defined in claim 1 including a layer of resilient material disposed about said core, and sealing means filling the remainder of the interior of said housing means and holding said core means in a substantially fixed position with respect to said housing means.

4. A system as defined in claim 1 wherein said bridge circuit means is a Maxwell bridge circuit with said coil means and said impedance element being in adjacent legs of the bridge.

5. A system as defined in claim 1 wherein said excitation and detector means includes an A.C. signal generator for exciting said bridge circuit means, said coil means and said impedance element form one half of a Maxwell bridge, and synchronous detector means coupled with said signal generator.

6. A system as defined in claim 1 wherein said core is U shaped and said coil means includes first and second coils respectively disposed about the legs thereof.

7. A system as defined in claim 6 wherein said plate means includes first and second ferromagnetic plate members respectively secured to the ends of the legs of said core and forming part of the exterior of said housing means.

8. A system as defined in claim 7 wherein said core is a laminated core and wherein said plate members are made of magnetic stainless steel.

9. A system as defined in claim 8 wherein said bridge circuit means is a Maxwell bridge and said impedance element is a resistor contained within said housing means.

10. A sensing unit for a proximity sensing system comprising in combination: housing means having first and second ferromagnetic plates forming part of the exterior thereof with a non-magnetic section disposed between said plates; a magnetic core disposed in said housing means and having at least one end thereof welded to one of said plates; and coil means disposed about said core.

11. Apparatus as defined in claim 10 wherein said core is U shaped and said coil means includes first and second coils disposed respectively about the legs thereof.

12. Apparatus as defined in claim 11 wherein said core is laminated and said plates are magnetic stainless steel.

13. Apparatus as defined in claim 11 and including a resistor connected to one of said coils and disposed within said housing means to form one half of a bridge circuit.

14. Apparatus as defined in claim 11 and including stress relieving resilient means disposed about said core, and sealing means filling the remainder of said housing means.

15. Apparatus as defined in claim 14 wherein said sealing means provides said non-magnetic section of said housing means between said plates.

16. A proximity sensing system comprising in combination: variable reactance magnetic circuit means including a high permeability U shaped laminated core; excitation coil means including first and second coils disposed about the legs of said core; bridge circuit means in the form of a Maxwell bridge having said coil means and a resistor as one half of the bridge circuit; bridge excitation and detector means coupled with said bridge circuit means and including an A.C. signal generator and synchronous detector means coupled thereto; high permeability plate means including first and second plates of magnetic stainless steel secured to the ends of said core; and housing means including said plate means as part of the exterior thereof disposed about said coil means, said resistor and said core.

References Cited

UNITED STATES PATENTS

| | | |
|---|---|---|
| 2,481,345 | 9/1949 | Reynst. |
| 2,901,676 | 8/1959 | Mittag. |
| 2,944,213 | 7/1960 | Foerster. |
| 2,980,837 | 4/1961 | Wu _____ 318—28 |
| 2,994,015 | 7/1961 | Eidam. |
| 3,284,082 | 11/1966 | Isenberg et al. ____ 340—280 X |

OTHER REFERENCES

Electronics World, "Testing & Measuring Inductors," by S. Zwass; September 1966, pp. 30–32.

JOHN F. COUCH, *Primary Examiner.*

G. GOLDBERG, *Assistant Examiner.*

U.S. Cl. X.R.

324—34, 59; 336—83, 90; 340—280, 282